United States Patent
Shim et al.

(10) Patent No.: US 9,738,269 B2
(45) Date of Patent: Aug. 22, 2017

(54) MOTOR SPEED CONTROL METHOD AND SYSTEM FOR IMPROVING PERFORMANCE OF RUNNING RESISTANCE EVALUATION

(71) Applicant: Hyundai Motor Company, Seoul (KR)

(72) Inventors: Jae-Yun Shim, Gyeonggi-do (KR);
Tae-Young Chung, Gyeonggi-do (KR);
Chun-Hyuk Lee, Gyeonggi-do (KR);
Yong-Hoon Lee, Seoul (KR);
Kyung-Taek Lee, Seoul (KR);
Jang-Hyo Lee, Gyeonggi-do (KR);
Dong-Su Ha, Gyeonggi-do (KR);
Young-Kwan Ko, Seoul (KR);
Keum-Jin Park, Gyeonggi-do (KR);
Byung-Hoon Yang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 23 days.

(21) Appl. No.: 14/932,072

(22) Filed: Nov. 4, 2015

(65) Prior Publication Data

US 2016/0288781 A1    Oct. 6, 2016

(30) Foreign Application Priority Data

Mar. 30, 2015  (KR) ........................ 10-2015-0044184

(51) Int. Cl.
*B60W 20/15*     (2016.01)
*F02D 29/02*     (2006.01)
*B60K 6/48*      (2007.10)
*B60W 40/10*     (2012.01)

(52) U.S. Cl.
CPC .............. *B60W 20/15* (2016.01); *B60K 6/48* (2013.01); *B60W 40/1005* (2013.01); *B60K 2006/4825* (2013.01); *B60W 2510/101* (2013.01); *B60W 2510/104* (2013.01); *B60W 2710/081* (2013.01); *Y02T 10/7258* (2013.01)

(58) Field of Classification Search
CPC ........... B60W 20/15; B60W 2710/081; B60W 2510/104; B60W 2510/101; B60W 40/1005; Y02T 10/7258; B60K 6/48; B60K 2006/4825
USPC .......................................... 701/22
See application file for complete search history.

(56) References Cited

U.S. PATENT DOCUMENTS 7,658,248 B2    2/2010    Kaya et al.

FOREIGN PATENT DOCUMENTS

| JP | 2004-208473 A | | 7/2004 | |
|----|---------------|---|--------|---|
| JP | 2009-196485 A | * | 9/2009 | ......... Y02T 10/6239 |
| JP | 5071438 B2    | | 11/2012 | |
| KR | 2013-0007844 A | | 1/2013 | |
| KR | 2013-0037924 A | | 4/2013 | |

* cited by examiner

*Primary Examiner* — Brian P Sweeney
(74) *Attorney, Agent, or Firm* — Mintz Levin Cohn Ferris Glovsky and Popeo, P.C.; Peter F. Corless (57) ABSTRACT

A motor speed control method and system for improving the performance of a running resistance evaluation of a hybrid electric vehicle are provided. The method includes determining whether a vehicle satisfies a running resistance evaluation start condition. When the vehicle satisfies the running resistance evaluation start condition, the speed of a motor is adjusted, which adjusts an input speed of a transmission to be equal to an output speed of the transmission. A speed adjustment of the motor is then completed using the speed of the motor and the output speed of the transmission.

15 Claims, 6 Drawing Sheets

MOTOR SPEED CONTROL METHOD AND SYSTEM FOR IMPROVING PERFORMANCE OF RUNNING RESISTANCE EVALUATION

CROSS-REFERENCE TO RELATED APPLICATIONS

This application claims priority to Korean Patent Application No. 10-2015-0044184, filed on Mar. 30, 2015, which is incorporated herein by reference in its entirety.

BACKGROUND

Field of the Invention

The present invention relates to a motor speed control method and system for improving the performance of a running resistance evaluation which prevents the driving force of a motor from transferring to vehicle wheels when evaluating a neutral gear running resistance of a Hybrid Electric Vehicle (HEV) to adjust the speed of a motor so that an input speed of a transmission is equal to an output speed of the transmission.

Description of Related Art

Figure 3:
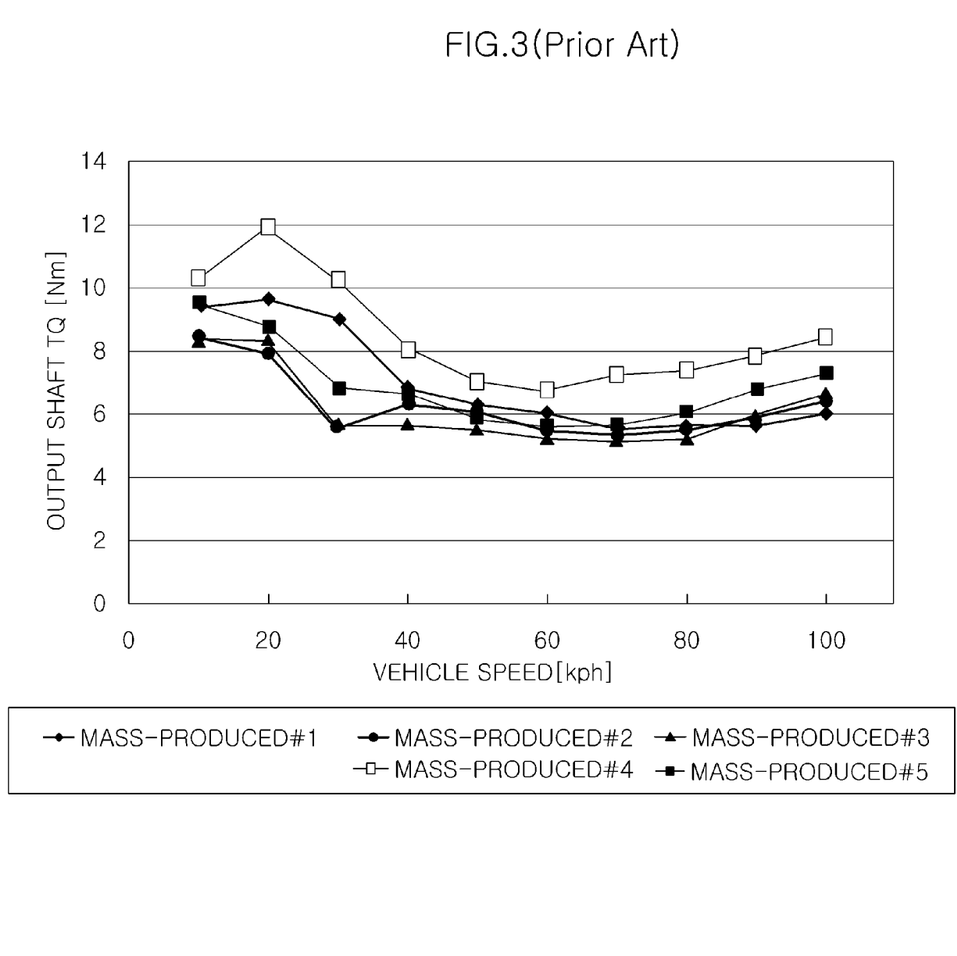
FIG. 3 is a diagram illustrating the output torque differences of wheels based on the speed of each individual vehicle when performing a running resistance evaluation by a conventional method wherein any motor speed control is not provided according to the prior art.
Figure 4:
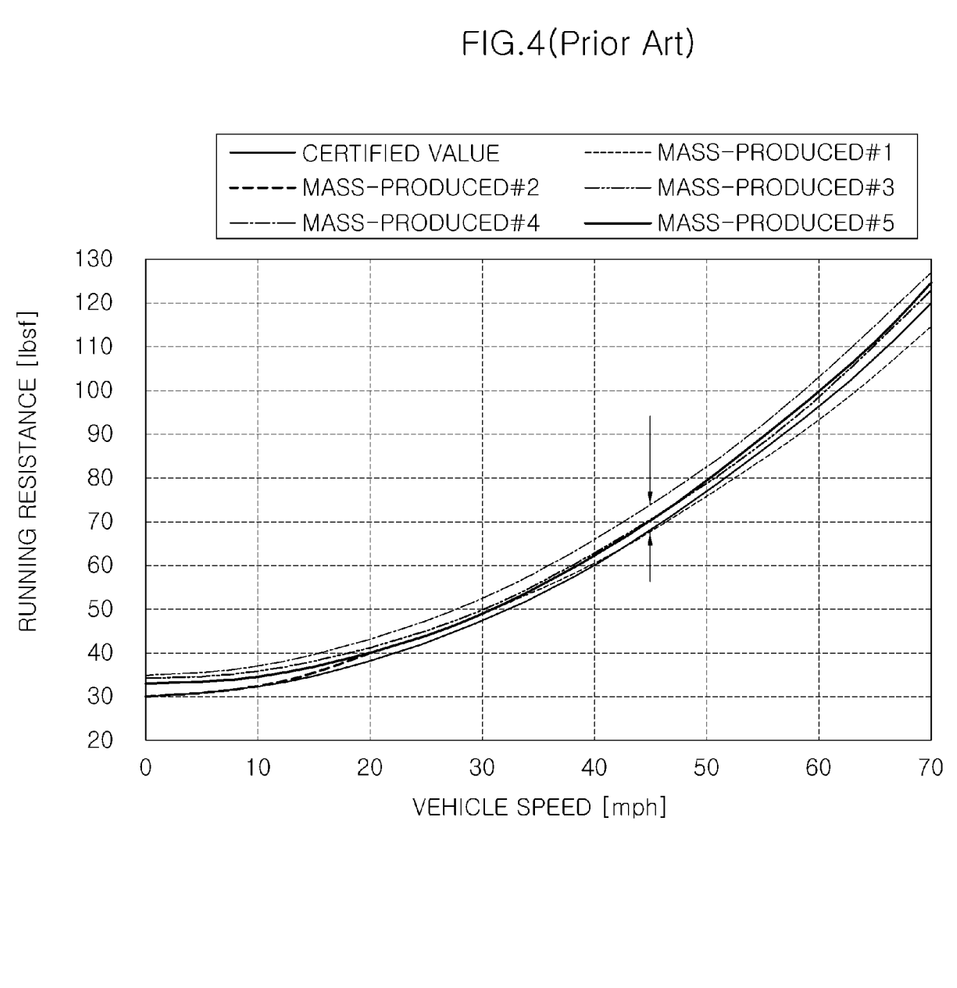
FIG. 4 is a diagram illustrating a running resistance deviation based on the speed of each individual vehicle when performing a running resistance evaluation by a conventional method wherein any motor speed control is not provided according to the prior art.

FIG. 3 is a diagram according to the prior art which illustrates an output torque difference of a vehicle wheel based on the speed of each individual vehicle when a running resistance is evaluated by a conventional method wherein a motor speed control is not provided. FIG. 4 is a diagram according to the prior art which illustrates a running resistance deviation based on the speed of each individual vehicle when a running resistance is evaluated by a conventional method wherein a motor speed control is not provided.

Referring to FIGS. 3 and 4, a neutral gear running resistance evaluation (e.g., coast-Down) for obtaining a road load coefficient to simulate a running load (e.g., roadbed state, wind state) of an actual road should be performed to receive a certificate for fuel efficiency of a vehicle. The results of the neutral gear running resistance evaluations with respect to mass-produced vehicles should be submitted to the certificate authority. Accordingly, the neutral gear running resistance evaluation (Coast-Down) is considered a key evaluation factor in the fuel efficiency certification.

More specifically, a vehicle is mounted on a dynamo during the neutral gear running resistance evaluation (Coast-Down), and the vehicle is forced to run at a substantially high speed or is driven on an actual road at a substantially high speed. Thereafter, the transmission of the vehicle is changed into the neutral gear, and the vehicle is adjusted to run the inertial mode. In this state, the running resistance coefficient is evaluated under the simulation of a running load (e.g., roadbed state, wind state, etc.). Particularly, the neutral gear running may be a running mode wherein the motor and a vehicle drive shaft are disconnected by the transmission to allow the wheels to rotate without power, and the vehicle is able to run in the inertial mode.

However, a reverse driving drag may occur during the running resistance evaluation of the hybrid electric vehicle, wherein the driving force of the motor transfers through the transmission to the wheels even though the transmission of the vehicle is in the neutral gear state. This phenomenon occurs since the driving force transfers in the sequence of an engine, an engine clutch, a motor, a transmission, a differential gear and wheels for a hybrid electric vehicle. Referring to FIG. 3, it may be possible to confirm a result of a neutral gear reverse driving drag evaluation of the transmission of each individual vehicle. In order words, since the reverse driving drags which occur at the same vehicle speed for each individual vehicle are different, it may be possible to confirm that the torques of the wheels occurring at the same vehicle speed are different in each individual vehicle. In addition, the torque deviation of the wheels has an effect on the deviation of a result of the running resistance during the running resistance evaluation (Coast-Down). In other words, since there is not any adjustment during the running resistance evaluation of the hybrid electric vehicle in the conventional art, the inertia of the motor may transfer through the transmission to the wheels, thus causing error in a result of the neutral running resistance evaluation.

Since the hybrid electric vehicle cannot run in the inertial mode due to the above-described phenomenon in the transmission, error may occur in a result of the running resistance evaluation, thus causing the deviation of the running deviation of each individual vehicle to increase. The transmission wherein the reverse driving drag has occurred may change vehicle loss, thus causing an error during the running resistance evaluation of each individual vehicle, which may result in the increased deviation of the running resistance of each individual vehicle. Referring to FIG. 4, as a result of the running resistance evaluation of each individual vehicle, it may be possible to confirm that the results of the running resistance of each individual vehicle are different from each other due to the neutral gear driving drag of the transmission, and a substantial amount of deviation may occur in the results of the running resistance of each individual vehicle.

Therefore, a motor speed control method is required for improving the performance of a running resistance evaluation of a hybrid electric vehicle which is able to remove any deviation of a running resistance between individual vehicles which has occurred due to the reverse driving drag of a transmission.

SUMMARY

The present invention provides a motor speed control method and system for improving the performance of a running resistance evaluation which decreases deviation in a result of a running resistance evaluation of each individual vehicle by preventing the driving force of a motor from transferring through a transmission to wheels due to a reverse driving drag of the transmission when evaluating a neutral gear running resistance of a hybrid electric vehicle to adjust the speed of the motor so that the input speed of the transmission may be about the same as the output speed of the transmission.

According to one aspect, a motor speed control method for improving the performance of a running resistance evaluation of a hybrid electric vehicle, may include determining, by a controller, whether a vehicle satisfies a running resistance evaluation (Coast-down) start condition; when the vehicle satisfies the running resistance evaluation (Coast-Down) start condition, adjusting, by the controller, the speed of a motor, which adjusts an input speed ($\omega_m$) of a transmission, so that an input speed ($\omega_m$) of the transmission may be about an output speed ($\omega_v$) of the transmission; and completing, by the controller, a speed adjustment of the motor using the speed of the motor and the output speed ($\omega_v$) of the transmission.

Additionally, when the vehicle satisfies the running resistance evaluation start condition, the transmission is in a neutral gear, and an accelerator pedal sensor is off, and a brake pedal sensor is off. When the running resistance evaluation (Coast-Down) is not satisfied, the running resistance evaluation start determination may be repeated. Particularly, in response to determining that the vehicle does not satisfy the running resistance evaluation start condition, the transmission is not in the neutral gear or the accelerator pedal sensor is on or the brake pedal sensor is on.

In addition, when the running resistance evaluation (Coast-Down) condition is satisfied, the speed of the motor may be adjusted to adjust the input speed ($\omega_m$) of the transmission to be about the same as the output speed ($\omega_v$) of the transmission, which reduces as time passes.

Further, whether the speed of the motor is equal to a predetermined control minimum transmission input speed may be determined. When the speed of the motor is equal to the predetermined control minimum transmission input speed, the speed of the motor may be adjusted to be equal to the control minimum transmission input speed. Additionally, whether the output speed ($\omega_v$) of the transmission is less than the predetermined control getting-out transmission output speed may be determined and when the output speed ($\omega_v$) of the transmission is less than the predetermined control getting-out transmission output speed, the speed adjustment of the motor may be terminated.

Additionally, when the speed of the motor is not equal to the predetermined control minimum transmission input speed, the motor speed may be adjusted again. When the output speed output speed of the transmission greater higher than a predetermined control getting-out transmission output speed, the motor speed may be maintained.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The terms and words used in the specification and claims should not be construed as their ordinary or dictionary sense. On the basis of the principle that the inventor can define the appropriate concept of a term in order to describe his/her own invention in the best way, it should be construed as meaning and concepts for complying with the technical idea of the present invention. Accordingly, the embodiments described in the present specification and the construction shown in the drawings are nothing but exemplary embodiments of the present invention, and do not cover all the technical ideas of the invention. Thus, it should be understood that various changes and modifications may be made at the time of filing the present application. In addition, detailed descriptions of functions and constructions well known in the art may be omitted to avoid unnecessarily obscuring the gist of the present invention. Exemplary embodiments of the present invention will be described below in more detail with reference to the accompanying drawings.

Hereinafter the motor speed control method for improving the performance of a running resistance evaluation according to an exemplary embodiment of the present invention will be described with reference to the accompanying drawings.

Figure 1:
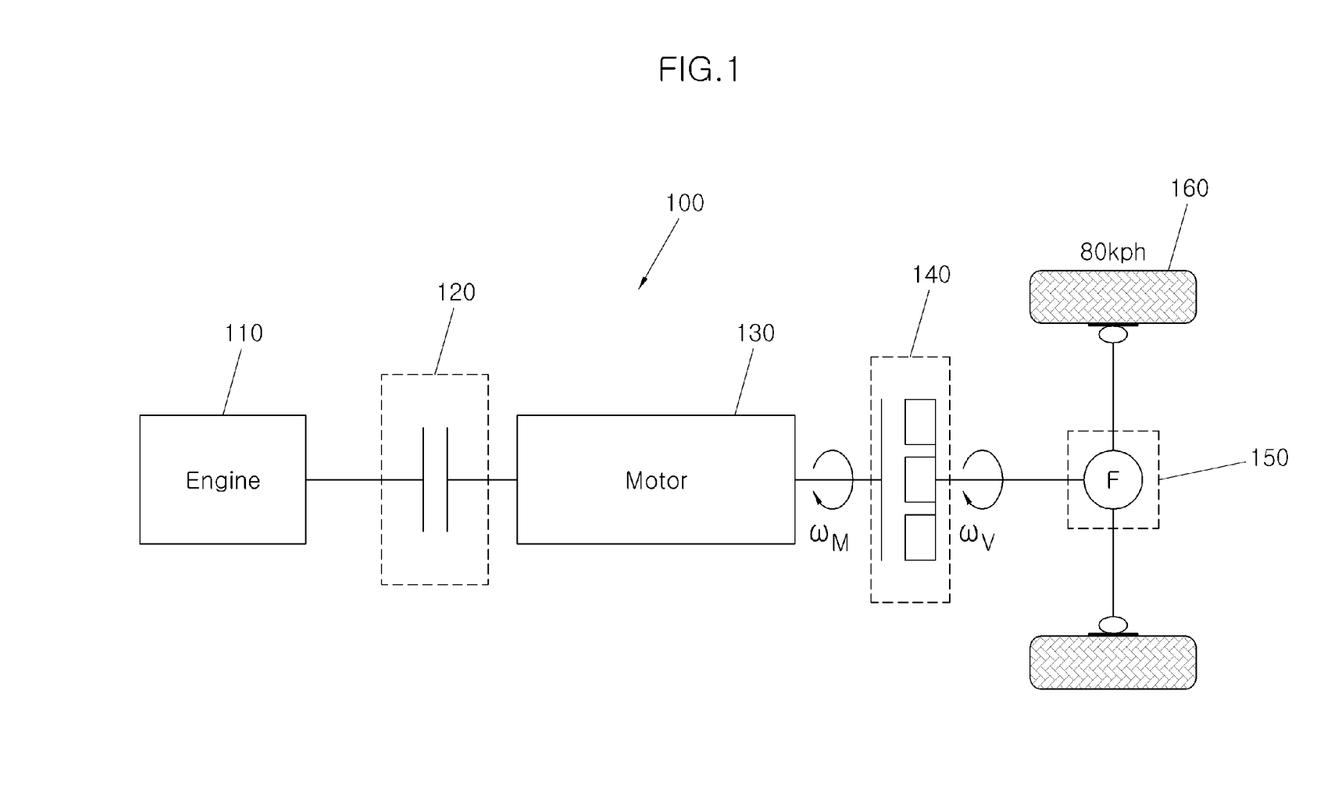
FIG. 1 is a plane view illustrating a driving system of a hybrid electric vehicle according to an exemplary embodiment of the present invention.
Figure 2:
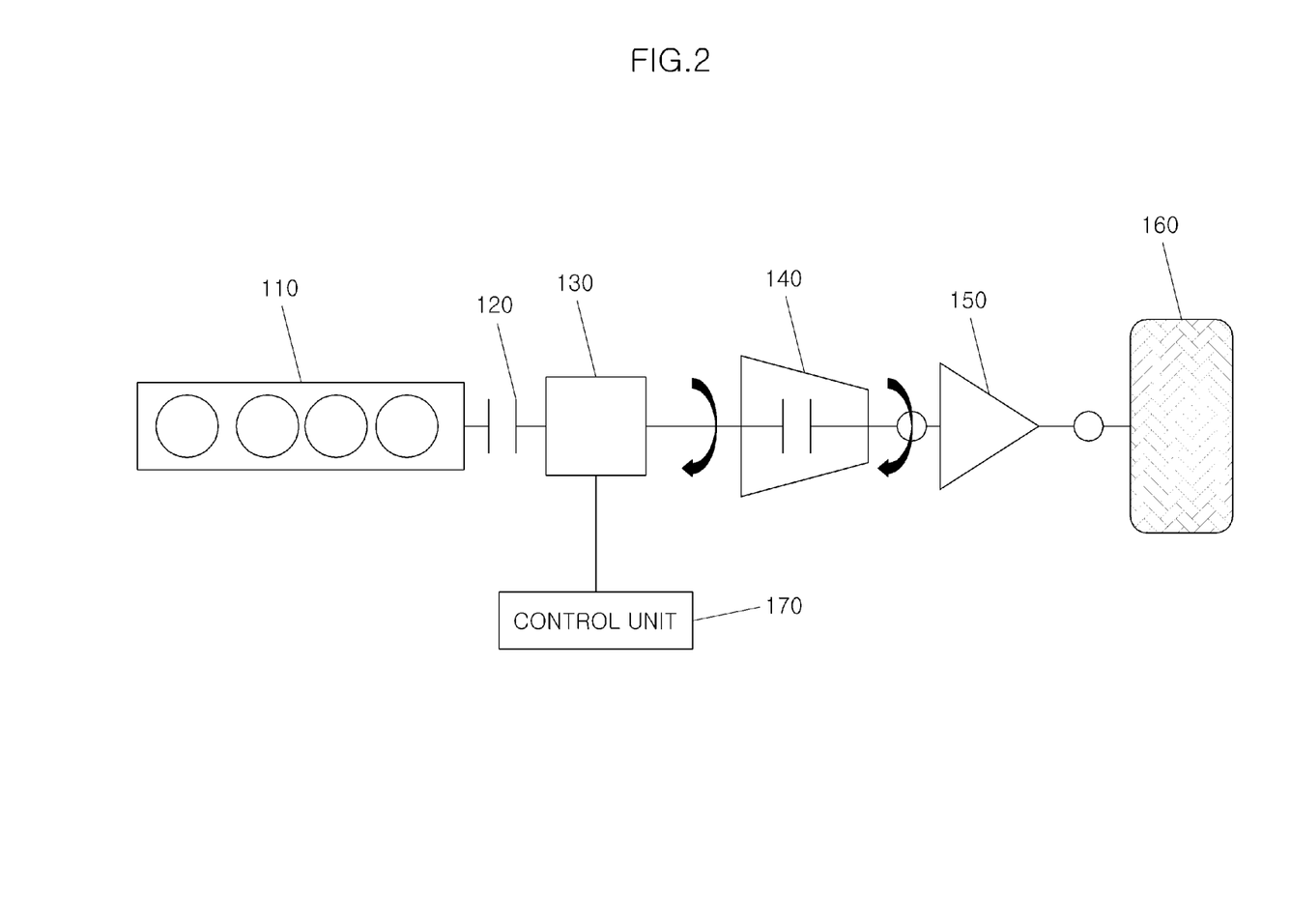
FIG. 2 is a block diagram illustrating a driving system of a hybrid electric vehicle according to an exemplary embodiment of the present invention.
Figure 5:
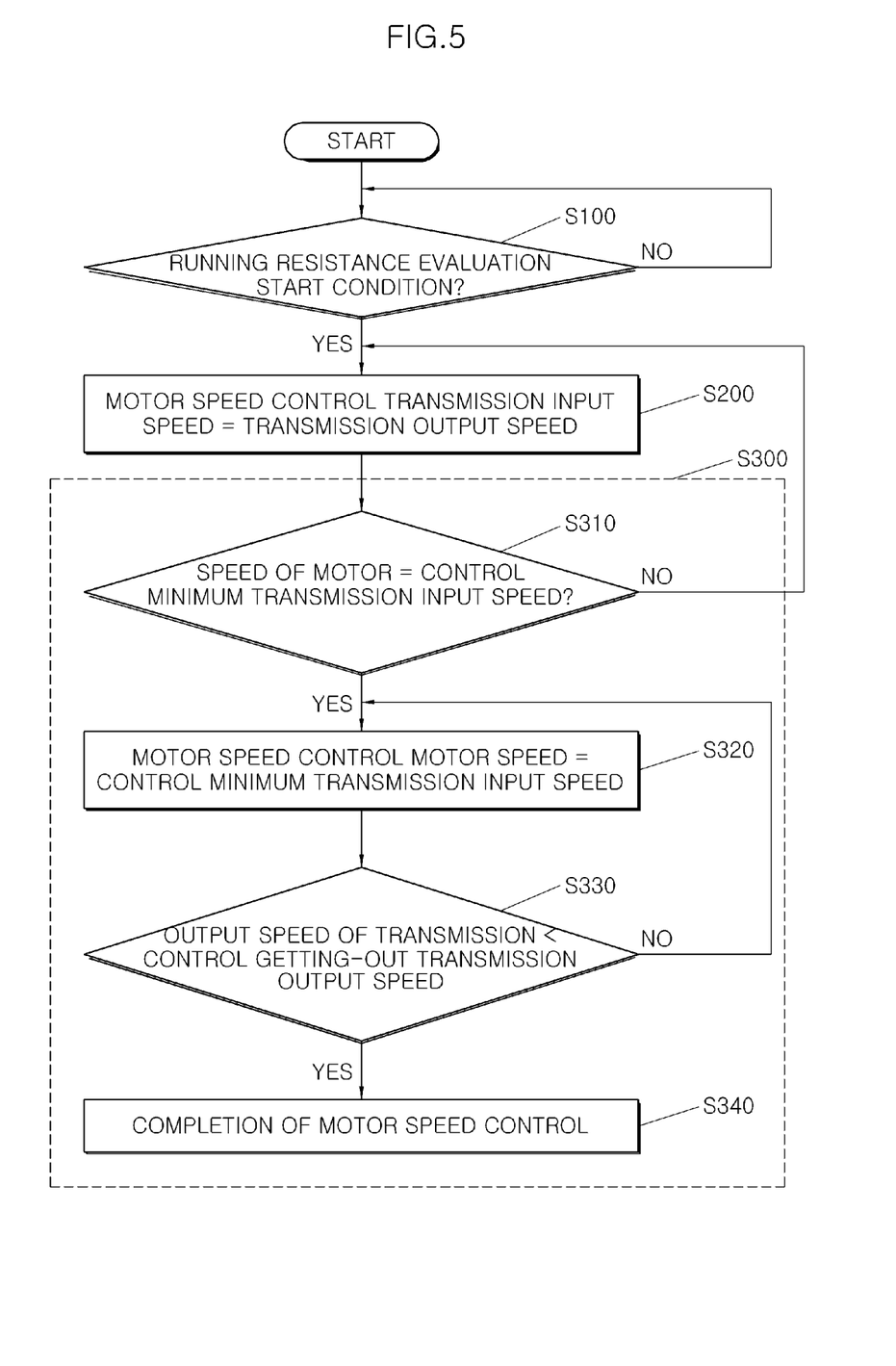
FIG. 5 is a flow chart for illustrating a motor speed control method according to an exemplary embodiment of the present invention.
Figure 6:
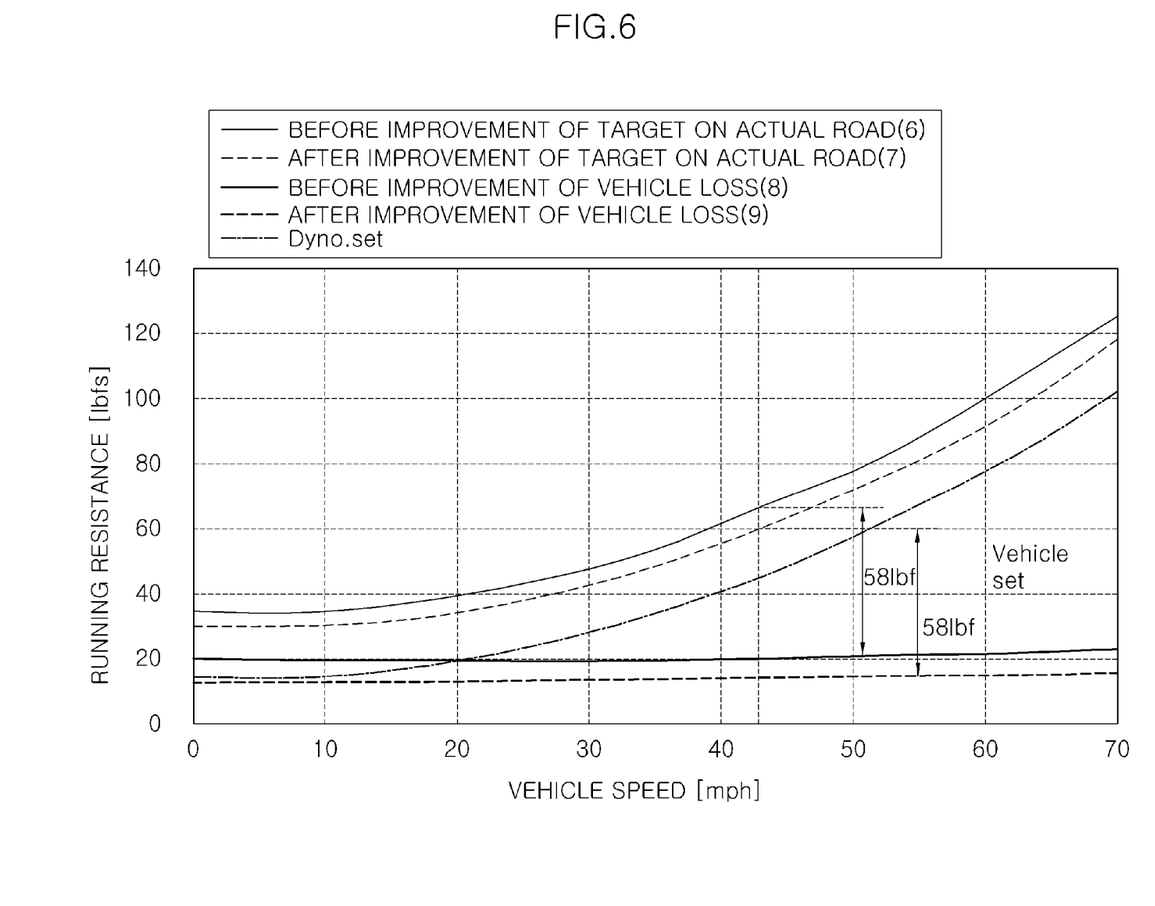
FIG. 6 is a diagram illustrating a result of an actual road running resistance and a result of a dynamo running resistance after a running resistance evaluation was executed according to an exemplary embodiment of the present invention.

FIG. 1 is a plane view illustrating a driving system of a hybrid electric vehicle. FIG. 2 is a block diagram illustrating a driving system of a hybrid electric vehicle. FIG. 5 is a flow chart for illustrating a motor speed control method according to the present invention. FIG. 6 is a diagram illustrating a result of an actual road running resistance and a result of a dynamo running resistance after a running resistance evaluation was executed according to the present invention. Referring to FIGS. 1, 2, 5 and 6, an exemplary embodiment of the motor speed control method for improving the performance of a running resistance evaluation according to the present invention may include, but is not limited to, a running resistance evaluation start determination step S100, a motor speed control step S200 and a running resistance evaluation completion step S300. The multiple steps described herein below may be executed by a controller having a processor and a memory.

In particular, a controller 170 may be configured to determine whether the vehicle 100 satisfies a running resistance evaluation (e.g., Coast-Down) start condition. The controller 170 may be configured to determine the state of the neutral gear of the transmission and when the vehicle satisfies a running resistance evaluation start condition based on a signal of an accelerator pedal sensor (APS) and a signal of a brake pedal sensor (BPS). In particular, when the controller 170 determines that the vehicle 100 satisfies a running resistance start condition, the transmission 140 may be in the neutral gear, the accelerator pedal sensor may be off, and the brake pedal sensor may be off. In other words, when the controller 170 determines that the vehicle 100 satisfies a running resistance evaluation start condition, the motor 130 and the transmission 140 may be determined to be separate, and any signal for driving the motor may not be input from the exterior to the motor. Particularly, the controller 170 may be a Motor Control Unit (MCU) for operating the motor in the vehicle.

Meanwhile, when the running resistance evaluation (Coast-Down) start condition is not ready, the running resistance evaluation start determination step S100 may be repeated. In particular, in response to determining that the vehicle 100 does not satisfy the running resistance evaluation start condition, the transmission 140 may be determined to not be in the neutral gear or the accelerator pedal senor may be on or the brake pedal sensor may be on.

Furthermore, when the vehicle 100 satisfies the running resistance evaluation (Coast-Down) start condition, the controller 170 may be configured to adjust the speed of the motor 130, in which the input speed ($\omega_m$) of the transmission may be adjusted to be about equal to the output speed ($\omega_v$) of the transmission. More specifically, the vehicle 100 runs in the inertial mode in the running resistance evaluation (Coast-down) condition where the transmission is in the neutral gear, the accelerator pedal sensor is off, and the brake pedal sensor is off, and thus the transmission connected to the wheels 160 may become a load free state. Therefore, as time passes, the output speed ($\omega_v$) of the transmission may decrease due to the friction with respect to the roadbed. Accordingly, a reverse driving drag may occur wherein the driving force of the motor 130 transfers through the transmission 140 to the wheels 160 even though the transmission of the vehicle is in the neutral gear state.

To prevent the above-mentioned reverse driving drag phenomenon, the controller 170 may be configured to adjust the speed of the motor 130 wherein the input speed ($\omega_m$) of the transmission may be adjusted to be about equal to the output speed ($\omega_v$) of the transmission. In other words, when the vehicle 100 satisfies the running resistance evaluation (Coast-Down) start condition, the controller 170 may be configured to adjust the speed of the motor 130. The input speed of the transmission may be adjusted to gradually decrease to cause the output speed ($\omega_v$) of the transmission to be about equal to the input speed ($\omega_m$) of the transmission. Therefore, it may be possible to prevent the reverse driving drag phenomenon wherein the driving force of the motor 130 transfers through the transmission 140 to the wheels. Particularly, the input speed ($\omega_m$) of the transmission and the output speed ($\omega_v$) of the transmission may be input from a transmission control unit (TCU) or a separate speed measuring device.

Referring to FIG. 6, since the reverse driving drag may be removed by the motor speed control method according to the present invention, it may be possible to confirm that the vehicle loss may be improved on an actual road or in a dynamo. More specifically, when the reverse driving drag occurs in the conventional art, the running resistance (refer to reference numbers 6 and 8 in FIG. 6) on the actual road and in the dynamo may improve and decrease to the running resistance (refer to reference numbers 7 and 9 in FIG. 6) on the actual road and in the dynamo based on the motor speed control method of the present invention. However, after the Dyno running resistance is measured, the Dyno setting load (refer to Dyno set in FIG. 6) was same, which means that it does not have any effect on the D-gear Dyno running evaluation.

Furthermore, the controller 170 may be configured to complete the speed control of the motor using the speed of the motor 130 and the output speed ($\omega_v$) of the transmission. More specifically, the running resistance evaluation completion step S300 may include, but is not limited to, a control minimum speed determination step S310, a motor seed maintaining step S320, a control getting-out speed determination step S330, and a speed control completion step S340.

In particular, the controller 170 may be configured to determine whether the speed of the motor is equal to the predetermined control minimum transmission input speed. The controller 170 may specifically be configured to determine whether the speed of the moor 130, which adjusts the input speed ($\omega_m$) of the transmission, is equal to the minimum transmission input speed which the motor 130 may adjust. In other words, the controller 170 may be configured to monitor the speed of the motor 130 which decreases equally to the output speed ($\omega_v$) of the transmission and determine whether the speed of the motor 130 reaches the predetermined control minimum transmission input speed which the controller 170 may be configured to adjust.

Particularly, when the speed of the motor 130 reaches the predetermined control minimum transmission input speed, since the running resistance collection for the sake of the running resistance evaluation of the vehicle ends, the controller 170 may be configured to complete the running resistance evaluation. In addition, the predetermined control minimum transmission input speed may vary based on the performances of the controller 170 and the motor 130 and may be obtained using the tests which will be executed using actual vehicles.

Meanwhile, when the speed of the motor 130 is not equal to the predetermined control minimum transmission input speed, the motor speed control step S200 may be repeated. In the motor speed maintaining step S320, when the speed of the motor 130 is equal to the predetermined control minimum transmission input speed, the controller 170 may be configured to adjust the speed of the motor 130 to be about equal to the control transmission input speed. More specifically, the controller 170 may be configured to maintain (e.g., not decrease) the speed of the motor 130 when the speed of the motor 130 is equal to the predetermined control minimum transmission input speed. In other words, the controller 170 may be configured to maintain the speed of the motor 130 to cause the speed to be about equal to the speed of the motor 130.

In the control getting-out speed determination step S330, the controller 170 may be configured to determine the output speed ($\omega_v$) of the transmission is less than the predetermined control getting-out transmission output speed. More specifically, the controller 170 may be configured to determine whether the output speed ($\omega_v$) of the transmission which gradually decreases with time to terminate the control of the motor 130 is less than the predetermined control getting-out transmission output speed. The predetermined control getting-out transmission output speed may be less than the predetermined control minimum transmission input speed and may be obtained using the tests which will be executed on an actual vehicle.

Meanwhile, when the output speed ($\omega_v$) of the transmission is less than the predetermined control getting-out transmission output speed, the motor speed maintaining step S320 may be repeated. In the speed control completion step S340, when the output speed ($\omega_v$) of the transmission is less than the predetermined control getting-out transmission output speed, the controller 170 may be configured to terminate the speed adjustment of the motor. More specifically, when the output speed ($\omega_v$) of the transmission is less than the predetermined control getting-out transmission output speed, the controller 170 may be configured to terminate the control for maintaining the speed of the motor so that the speed may be about equal to the control minimum transmission input speed, thus completing the speed control of the motor.

According to the motor speed control method for improving the performance of a running resistance evaluation according to the present invention, since it may be possible to decrease any deviation in a result of a running resistance evaluation of each individual vehicle by preventing the driving force of a motor from transferring to wheels when evaluating a neutral running resistance of a hybrid electric vehicle, thus more easily satisfying a fuel efficiency certification evaluation of a hybrid electric vehicle.

While the present invention has been described with respect to the specific exemplary embodiments, it will be apparent to those skilled in the art that various changes and modifications may be made without departing from the spirit and scope of the invention as defined in the following claims.

What is claimed is:

1. A motor speed control method for improving the performance of a running resistance evaluation of a hybrid electric vehicle, comprising:
    determining, by a controller, whether a vehicle satisfies a running resistance evaluation start condition;
    adjusting, by the controller, the speed of a motor when the vehicle satisfies the running resistance evaluation start condition, wherein an input speed of the transmission is adjusted to be equal to an output speed of the transmission; and
    completing, by the controller, a speed adjustment of the motor using the speed of the motor and the output speed of the transmission,
    wherein the completing of the speed adjustment of the motor includes:
        determining, by the controller, whether the speed of the motor is equal to a predetermined control minimum transmission input speed;
        adjusting, by the controller, the speed of the motor to be equal to the control minimum transmission input speed when the speed of the motor is equal to the predetermined control minimum transmission input speed;
        determining, by the controller, whether the output speed of the transmission is less than the predetermined control getting-out transmission output speed; and
        terminating, by the controller, the speed adjustment of the motor when the output speed of the transmission is less than the predetermined control getting-out transmission output speed.

2. The method of claim 1, wherein when the vehicle satisfies the running resistance evaluation start condition, the transmission is in a neutral gear, an accelerator pedal sensor is off, and a brake pedal sensor is off.

3. The method of claim 1, wherein when the running resistance evaluation is not satisfied, the running resistance evaluation determination is repeated.

4. The method of claim 3, wherein in response to determining that the vehicle does not satisfies the running resistance evaluation start condition, the transmission is not in the neutral gear, the accelerator pedal sensor is on, or the brake pedal sensor is on.

5. The method of claim 1, further comprising:
    adjusting, by the controller, the speed of the motor to adjust the input speed of the transmission to be equal to the output speed of the transmission which decreases with time, when the running resistance evaluation condition is satisfied.

6. The method of claim 1, wherein when the speed of the motor is not equal to the predetermined control minimum transmission input speed, the motor speed adjustment is repeated.

7. The method of claim 1, wherein when the output speed output speed of the transmission is greater than a predetermined control getting-out transmission output speed, the motor speed is maintained.

8. A motor speed control system for improving the performance of a running resistance evaluation of a hybrid electric vehicle, comprising:
    a memory configured to store program instructions; and
    a processor configured to execute the program instructions, the program instructions when executed configured to:
        determine whether a vehicle satisfies a running resistance evaluation start condition;
        adjust the speed of a motor when the vehicle satisfies the running resistance evaluation start condition, wherein an input speed of the transmission is adjusted to be equal to an output speed of the transmission; and
        complete a speed adjustment of the motor using the speed of the motor and the output speed of the transmission wherein the program instructions when executed are further configured to:
 determine whether the speed of the motor is equal to a predetermined control minimum transmission input speed;
 adjust the speed of the motor to be equal to the control minimum transmission input speed when the speed of the motor is equal to the predetermined control minimum transmission input speed;
 determine whether the output speed of the transmission is less than the predetermined control getting-out transmission output speed; and
 terminate the speed adjustment of the motor when the output speed of the transmission is less than the predetermined control getting-out transmission output speed.

9. The system of claim 8, wherein when the vehicle satisfies the running resistance evaluation start condition, the transmission is in a neutral gear, an accelerator pedal sensor is off, and a brake pedal sensor is off.

10. The system of claim 8, wherein when the running resistance evaluation is not satisfied, the running resistance evaluation determination is repeated.

11. The system of claim 8, wherein the program instructions when executed are further configured to:
 adjust the speed of the motor to adjust the input speed of the transmission to be equal to the output speed of the transmission which decreases with time, when the running resistance evaluation condition is satisfied.

12. A non-transitory computer readable medium containing program instructions executed by a controller, the computer readable medium comprising:
 program instructions that determine whether a vehicle satisfies a running resistance evaluation start condition;
 program instructions that adjust the speed of a motor when the vehicle satisfies the running resistance evaluation start condition, wherein an input speed of the transmission is adjusted to be equal to an output speed of the transmission; and
 program instructions that complete a speed adjustment of the motor using the speed of the motor and the output speed of the transmission,
 wherein the program instructions that complete the speed adjustment of the motor further include:
 program instructions that determine whether the speed of the motor is equal to a predetermined control minimum transmission input speed;
 program instructions that adjust the speed of the motor to be equal to the control minimum transmission input speed when the speed of the motor is equal to the predetermined control minimum transmission input speed;
 program instructions that determine whether the output speed of the transmission is less than the predetermined control getting-out transmission output speed; and
 program instructions that terminate the speed adjustment of the motor when the output speed of the transmission is less than the predetermined control getting-out transmission output speed.

13. The non-transitory computer readable medium of claim 12, wherein when the vehicle satisfies the running resistance evaluation start condition, the transmission is in a neutral gear, an accelerator pedal sensor is off, and a brake pedal sensor is off.

14. The non-transitory computer readable medium of claim 12, wherein when the running resistance evaluation is not satisfied, the running resistance evaluation determination is repeated.

15. The non-transitory computer readable medium of claim 12, further comprising:
 program instructions that adjust the speed of the motor to adjust the input speed of the transmission to be equal to the output speed of the transmission which decreases with time, when the running resistance evaluation condition is satisfied.

* * * * *